(12) United States Patent
Liotopoulos et al.

(10) Patent No.: US 8,392,109 B2
(45) Date of Patent: Mar. 5, 2013

(54) METHODOLOGY AND SYSTEM FOR ROUTING OPTIMIZATION IN GPS-BASED NAVIGATION, COMBINING DYNAMIC TRAFFIC DATA

(76) Inventors: Fotios K. Liotopoulos, Salonika (GR); Paraskevi Karypidou, Salonika (GR)

( * ) Notice: Subject to any disclaimer, the term of this patent is extended or adjusted under 35 U.S.C. 154(b) by 64 days.

(21) Appl. No.: 13/139,659

(22) PCT Filed: Dec. 10, 2009

(86) PCT No.: PCT/GR2009/000066
§ 371 (c)(1),
(2), (4) Date: Jun. 14, 2011

(87) PCT Pub. No.: WO2010/073053
PCT Pub. Date: Jul. 1, 2010

(65) Prior Publication Data
US 2011/0251790 A1    Oct. 13, 2011

(30) Foreign Application Priority Data

Dec. 22, 2008 (GR) .............................. 20080100812

(51) Int. Cl.
*G01C 21/00* (2006.01)
(52) U.S. Cl. ........ 701/409; 701/430; 701/450; 701/454; 701/462; 701/532
(58) Field of Classification Search .................. 701/409, 701/430, 450, 451, 454, 462, 532
See application file for complete search history.

(56) References Cited

U.S. PATENT DOCUMENTS

| | | | | |
|---|---|---|---|---|
| 6,654,681 B1* | 11/2003 | Kiendl et al. | ................. | 701/117 |
| 7,343,242 B2* | 3/2008 | Breitenberger et al. | ...... | 701/117 |
| 7,650,227 B2* | 1/2010 | Kirk et al. | ...................... | 701/117 |
| 7,711,699 B2* | 5/2010 | Koromyslov et al. | ........ | 701/117 |
| 7,835,858 B2* | 11/2010 | Smyth et al. | ................... | 701/439 |
| 7,984,055 B2* | 7/2011 | Koromyslov et al. | ........ | 707/736 |
| 8,014,937 B2* | 9/2011 | Smyth et al. | ................... | 701/119 |
| 8,046,166 B2* | 10/2011 | Cabral et al. | ................... | 701/461 |
| 8,055,443 B1* | 11/2011 | Uyeki et al. | ................... | 701/414 |
| 2006/0082472 A1* | 4/2006 | Adachi et al. | ............. | 340/995.13 |
| 2006/0089787 A1* | 4/2006 | Burr et al. | ...................... | 701/202 |
| 2007/0189181 A1* | 8/2007 | Kirk et al. | ...................... | 370/252 |
| 2008/0294337 A1 | 11/2008 | Dawson et al. | | |
| 2009/0271101 A1* | 10/2009 | Relyea et al. | .................. | 701/118 |

OTHER PUBLICATIONS

International Search Report, Sep. 16, 2010, from International Phase of the instant application.

\* cited by examiner

*Primary Examiner* — James Trammell
*Assistant Examiner* — Truc M Do
(74) *Attorney, Agent, or Firm* — Jackson Patent Law Office

(57) ABSTRACT

Disclosed is a methodology for the collection, processing and distribution of traffic data and delivering more accurate routing in GPS-based Personal Navigation Assistants (PNAs). The methodology includes a) Data Collection Methodology (DCM), b) a Data Incorporation Methodology (DIM), and c) a Routing Methodology (RM). The DCM regards the collection of information related to the traffic flow in each road. The DIM includes a procedure executed at a central system (CS), outside the PNA, performing the incorporation of the "trace data" (i.e. user-submitted route-related information, including a list of periodically collected, time-stamped GPS samples, augmented with other parameter values defining the vehicle-type, weather-conditions, road-type, holiday-type), collected by the DCM. The RM determines, by means of suitable PNA software, the shortest route from a starting point to a final destination, through the combining the static data from existing maps residing inside the PNA, with the dynamic (time-variant) data derived by the DIM.

3 Claims, 4 Drawing Sheets

Data Collection Methodology (DCM).

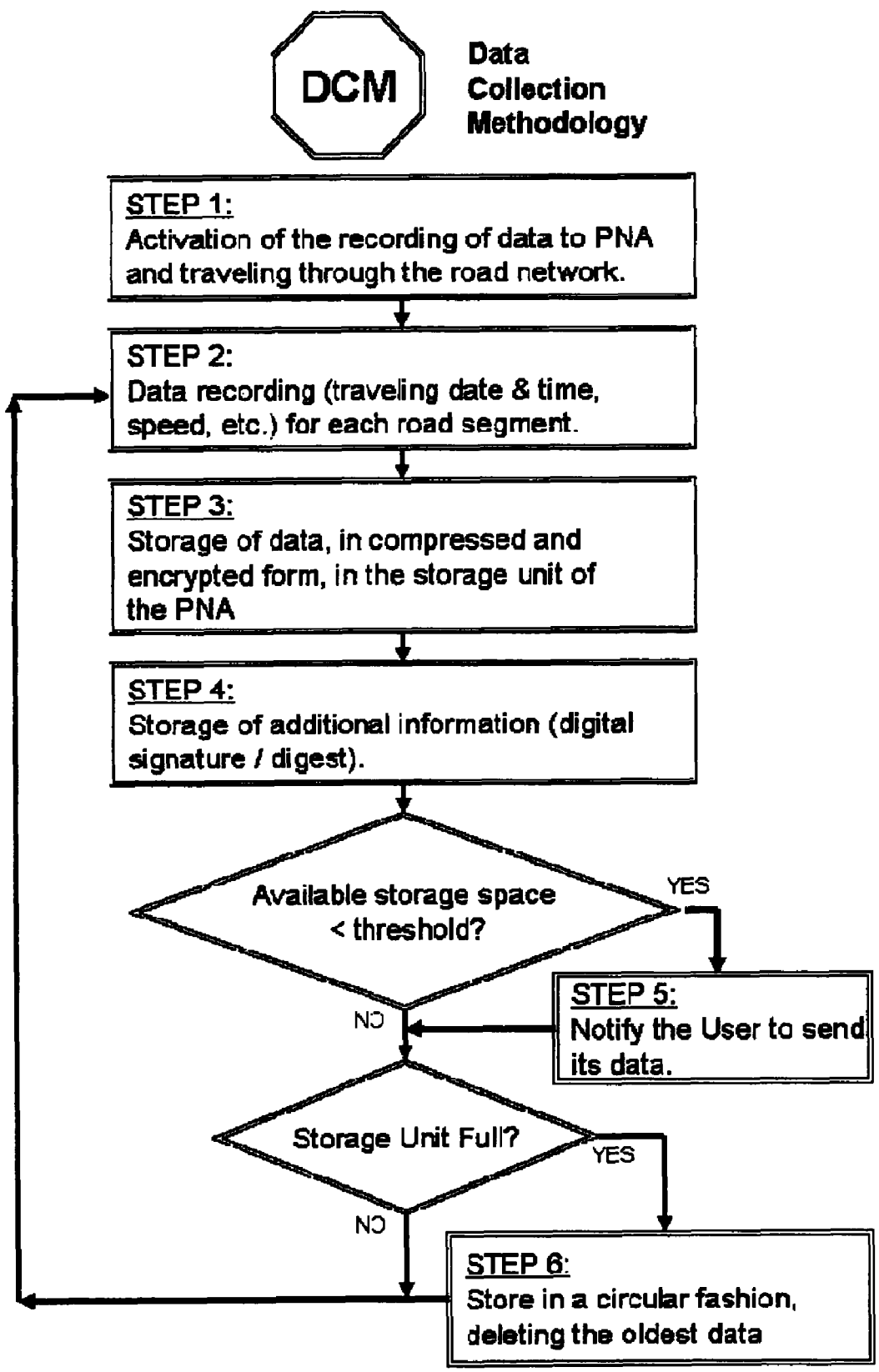
FIGURE 1: Data Collection Methodology (DCM).

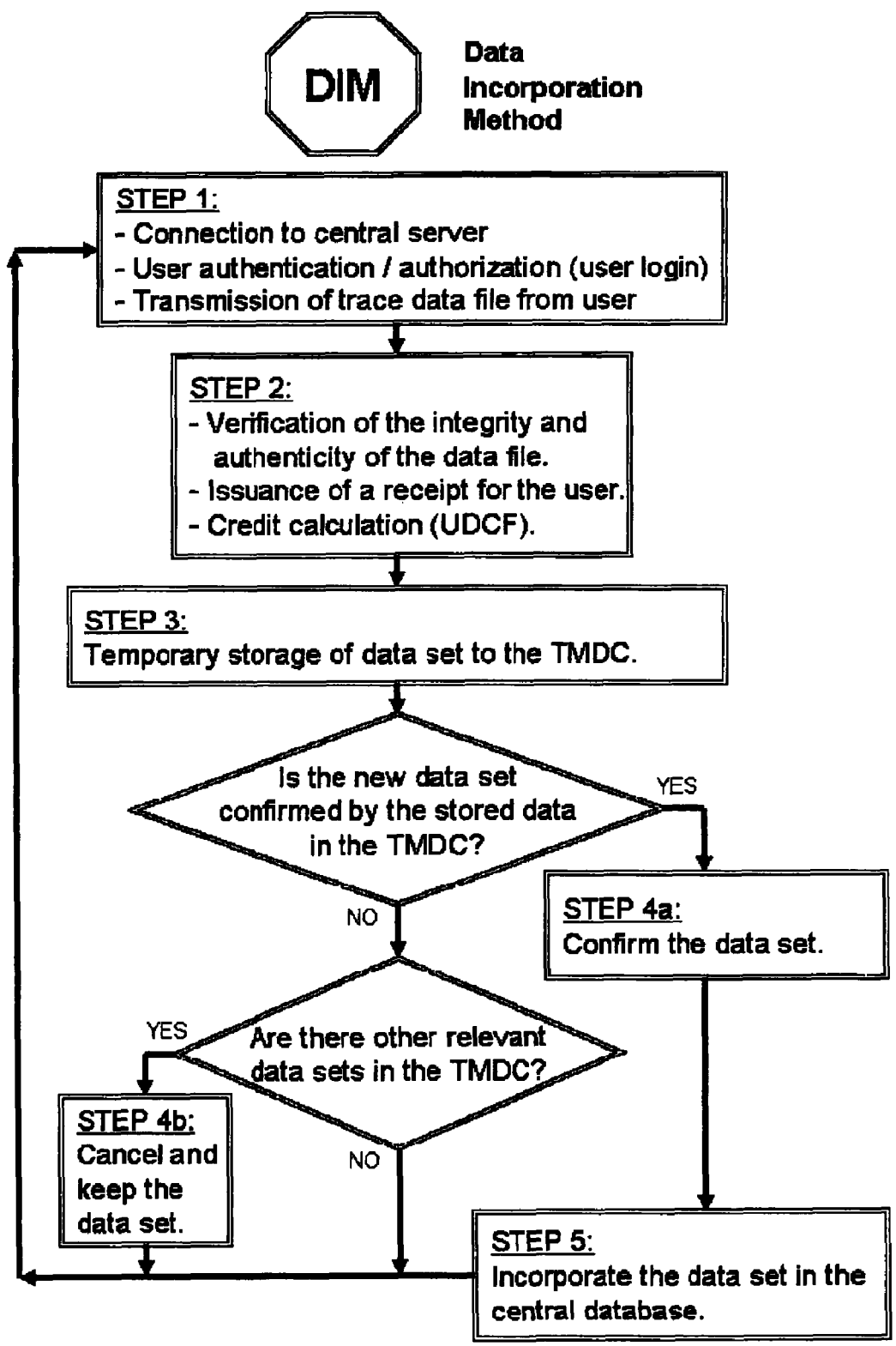
FIGURE 2: Data Incorporation Methodology (DIM).

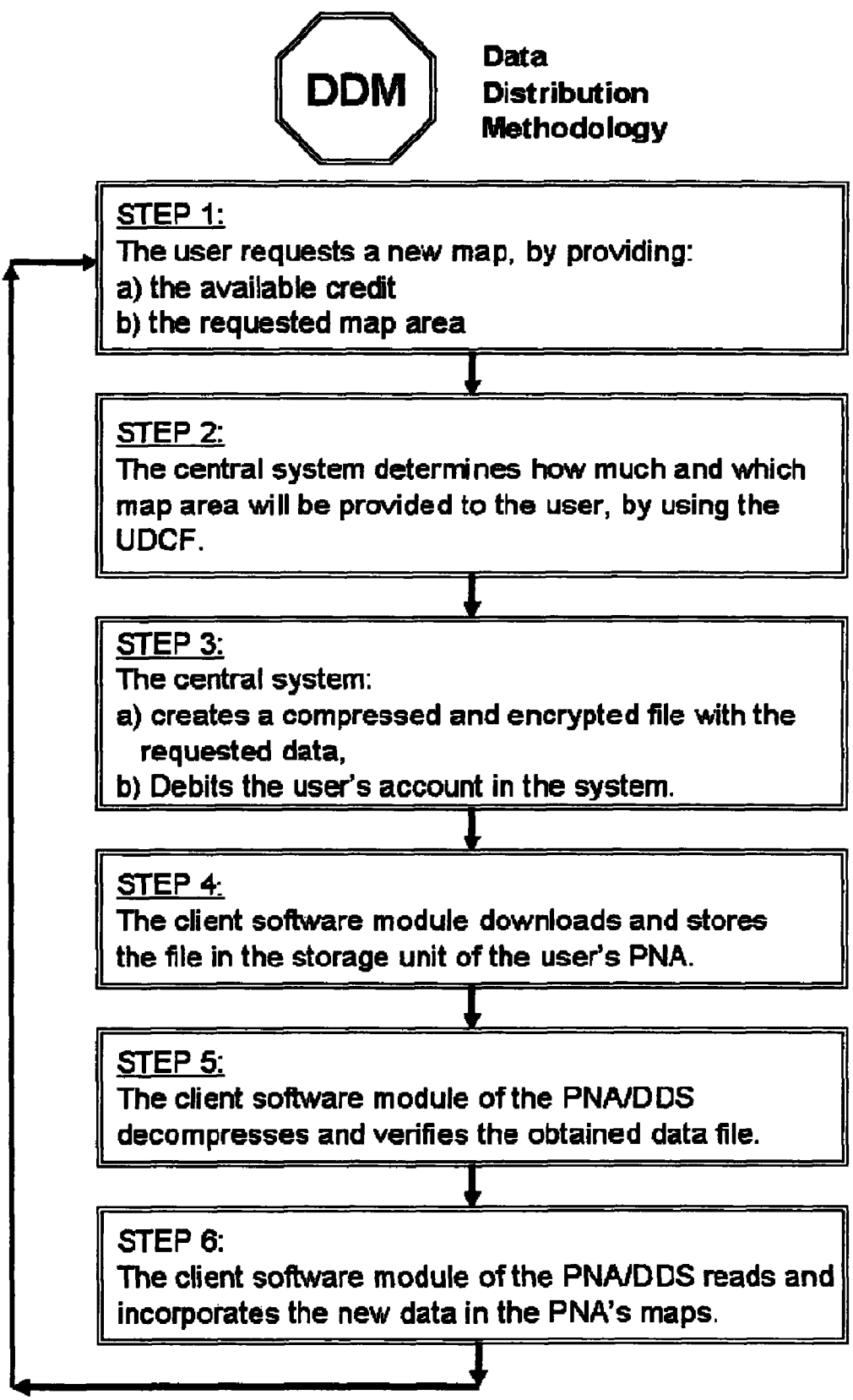
FIGURE 3: Data Distribution Methodology (DDM).

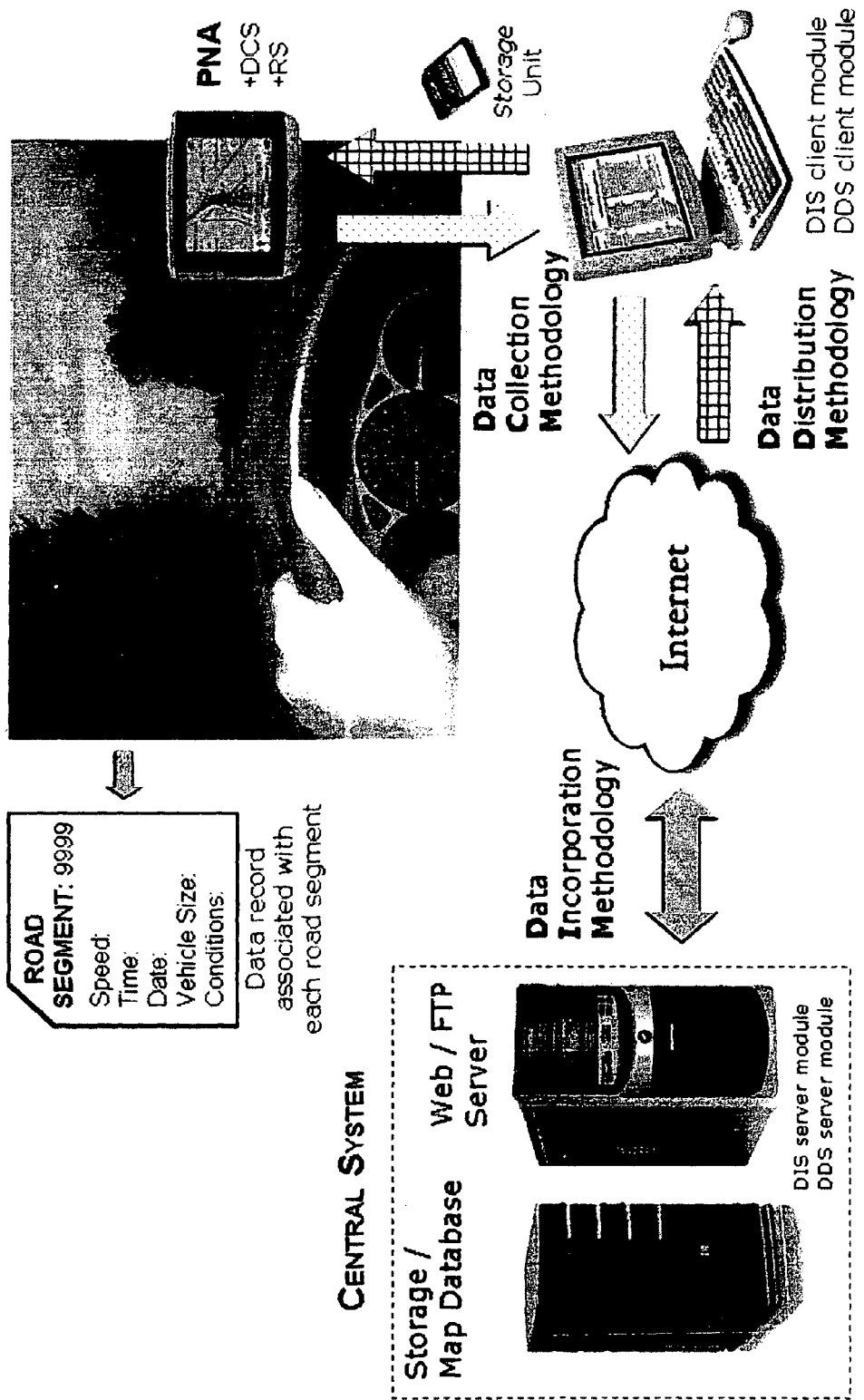
FIGURE 4: The overall Methodology and Systems for improved routing decisions by a PNA.

METHODOLOGY AND SYSTEM FOR ROUTING OPTIMIZATION IN GPS-BASED NAVIGATION, COMBINING DYNAMIC TRAFFIC DATA

CROSS-REFERENCE TO RELATED APPLICATIONS

This Application is the U.S. National Phase of International Patent Application PCT/GR2009/000066 filed 10 Dec. 2009 METHODOLOGY AND SYSTEM FOR ROUTING OPTIMIZATION IN GPS-BASED NAVIGATION, COMBINING DYNAMIC TRAFFIC DATA. Application PCT/GR2009/000066 claims priority benefits under 35 U.S.C §119 of Application GR 20080100812, filed 22 Dec. 2008.

BACKGROUND OF THE INVENTION

1. Field of the Invention

The methodology and system relates to an improvement on the routing accuracy of GPS-based navigation systems, or "Personal Navigation Assistants" (PNAs), using a combination of user collected dynamic traffic data.

2. Description of Related Art

One of the most useful operations of a PNA is the determination of the optimal (or sub-optimal) route between two points (start and destination), based on specific criteria and constraints. The theoretical problem of the routing optimization between two nodes in a system of interconnected nodes, wherein each link (edge) between two nodes has a respective constant (static) or variable (dynamic) weight, associated with it, is known for many decades and is solved in various ways (e.g. Dijkstra, Bellman-Ford algorithms etc. for the determination of the shortest path, etc.)

The first commercially available PNAs up until today have been mainly using static data (weights), which are associated with each "road segment" (defined as a part of a road or path, of short length, and between two intersections or other two intermediate reference points), such as the mean travelling time of that road segment, which is usually determined either arbitrarily or based on the (static) speed limit of that road segment. More recent methods recommended the correlation of each road segment with time-dependent information or user-related information, so that better routing results are obtained. Such time-dependent information is e.g. the traffic data, which depends on the day and time the user passes through, and which are obtained by a PNA via an offline server and a communication channel. The information, which depends on the user, may comprise a selection of routes or user preferences based on the recorded habits and their profile.

Until now, various methods and systems have been proposed for the collection of such dynamic traffic information, such as:

- traffic sensors, which provide, online/real-time or off-line, various parameters of the traffic in major roads,
- mobile telephony providers, which provide information about the density of mobile phones (and thus the density of cars) in various areas, thereby providing an indication for the level of the traffic in these areas,
- users of mobile telephones with GPS, which provide in real time, in central web-servers, information about the traffic conditions etc.

All this time-variable information is collected and unified in off-line central servers, which subsequently provide their data by means of a subscription and in real time, when requested.

The majority of the available GPS-based navigation systems (for vehicles or mobile phones) use static information, which is recorded in maps, in order to execute navigation calculation and to define specific routes from a given start to a given destination (or via intermediate destinations). During the last 5 years, there have been many proposals in the literature about the improvement of the routing capabilities of these systems, by inputting non-static (or time-variable) data, which is collected mainly from external sources and stations (sensors, web-servers etc.), as well as through various communication channels, such as GSM/GPRS/WiFi/WiMAX/etc. connections.

Furthermore, the method of data collection from mobile PNAs and their free distribution to PNA users have been used for the last 3 years by the OpenStreetMap Foundation (http://www.openstreetmap.org). However, this data is of general type (i.e. not directly exploitable by the available PNAs) and the respective systems do not process nor distribute road-segment related information for the optimization of the routing, but simply compose a common global map without traffic data about the road network.

REFERENCES

Jin Y. Yen, "An algorithm for Finding Shortest Routes from all Source Nodes to a Given Destination in General Network", in Quarterly of Applied Mathematics, 27, pp. 526-530, 1970.

Richard Bellman, "On a Routing Problem", in Quarterly of Applied Mathematics, 16(1), pp. 87-90, 1958.

Thomas H. Cormen, Charles E. Leiserson, Ronald L. Rivest, and Clifford Stein, "Introduction to Algorithms", $2^{nd}$ edition. MIT Press and McGraw-Hill, 2001. ISBN 0-262-03293-7.

F. Benjamin Zhan, and Charle E. Noon. 1998. Shortest Path Algorithms: An Evaluation Using Real Road Networks. Transportation Science 32(1): 65-73.

RELATED PATENTS

WO98/54682: Generation and Delivery of travel-related, location-sensitive information.
Differences: It is about locating a moving vehicle equipped with a position detection transmitter.

US2003/0083813: Navigation system for providing real-time traffic information and traffic information processing by the same.
Differences: It relates to real-time traffic conditions that are transmitted via a communication network.

US2004/0044465: Automated route determination based on day of route reversal.
Differences: It relates to the computation of a route by a central system and its online transmission thereof to mobile systems (PNAs) as opposed to our local computation method by the PNA.

EP1387145 (2004): Differential dynamic navigation system for off-board navigation.
Differences: It relates to real-time traffic conditions that are transmitted via a communication network, as opposed to our near-real-time traffic information which does not require an active communication network (offline method).

WO2007/042796: A method of and a navigation device for time-dependent route planning.
Differences: It very broadly reports general methods of using time-dependent information for optimized routing, without clearly defining details such as use of a magnetic medium with specific data coding and compression, procedures for filtering false information, method for selecting and incorporating time-dependent data with a time constant, etc. The specific differentiation of our method and systems is essential in order to make them applicable in a worldwide scale (i.e. for the development of a viable and realistic "world map" system with world-wide user contributions). Also, this patent does not distinguish the variant information based on the type of vehicle, as we do. These extra parameters result in higher problem complexity which requires more complex solutions and system implementations.

WO2007/044213: Optimal route calculation based upon cohort analysis.

Differences: It generally refers to "variable information" ("cohort attribute information"), transmitted from a "remote navigation system" to a PNA, without defining the method, the procedures ensuring the reliability and validity, the procedures of collection, selection and incorporation of the data. Furthermore, this method does not send to the central system all the data of the road network, but only what is not included in the initially suggested route by the system. For systems with different routing algorithms, our recording and incorporation method is more complete.

WO 2008/005187: Inferring road speeds for context-sensitive routing.

Differences: In general it relates to data collection without defining a specific method. It uses a different statistical processing for the incorporation of the new data in the central processor. It does not define a method for selecting and distributing data to users and for incorporating thereof to the available PNA.

US 2008/0294337(A1): Travel-related Information Processing System.

Differences: It is about a method for processing and distributing user-provided comments and annotations regarding entire routing paths and making them available in real-time. Our methodology is different in that, a) it does not require a transceiver to bidirectionally communicate real-time data, i.e., it is an offline method, b) it is not dependent on subjective user input, c) it associates data with every road segment, not only with entire paths.

SUMMARY OF THE INVENTION

According to an aspect of the present invention, there is a methodology for the collection, processing and distribution of traffic data and delivering more accurate routing in GPS-based Personal Navigation Assistants (PNAs). The methodology includes a) Data Collection Methodology (DCM), b) a Data Incorporation Methodology (DIM), and c) a Routing Methodology (RM). The DCM regards the collection of information related to the traffic flow in each road. The DIM includes a procedure executed at a central system (CS), outside the PNA, performing the incorporation of the "trace data" (i.e. user-submitted route-related information, including a list of periodically collected, time-stamped GPS samples, augmented with other parameter values defining the vehicle-type, weather-conditions, road-type, holiday-type), collected by the DCM. The RM determines, by means of suitable PNA software, the shortest route from a starting point to a final destination, through the combining the static data from existing maps residing inside the PNA, with the dynamic (time-variant) data derived by the DIM.

BRIEF DESCRIPTION OF THE DRAWING

FIG. 1 is a flow chart showing a data collection methodology (DCM).

FIG. 2 is a flow chart showing a data incorporation methodology (DIM).

FIG. 3 is a flow chart showing a data distribution methodology (DDM).

FIG. 4 is a diagram showing an overall methodology and system to improve the routing decision by a PNA.

DETAILED DESCRIPTION OF EMBODIMENTS OF THE INVENTION

Advantages of Our Methodology and Systems

The time-dependent data collected and used by our method and systems lead to more accurate routing decisions than those from the commercially available PNA, which are based on static traffic information (e.g. the speed limit or the kind of the road).

The method and the systems do not require special infrastructure or other external information sources (e.g. road sensors or mobile phone density depiction). These external information sources may be exploited for further optimization of the routing decision, but their use is optional.

The method and the systems provide results more accurate than those from other methods, which are based on references and density data of the mobile-telephony users, since these methods do not accurately distinguish and isolate traffic data for specific roads, or for vary small roads.

The method and the systems have an inherent, independent mechanism: a) for the production of new maps (as regards non-mapped ground) and, b) for self-upgrading of already available maps, attributes not supported by the majority of the related methods (e.g. navigation based on real-time traffic data).

The method and the systems can distinguish and provide more accurate routing instructions, depending on the type of the vehicle (e.g. fast vehicle, medium-speed vehicle, truck, bus, fast motorcycle, slow motorcycle, pedestrian, etc.) and the weather conditions and the corresponding state of the road (sunlight, rain, snow etc.) both during recording and during routing.

The method and the systems have a better expansibility than other methods and respective systems (e.g. navigation based on real-time traffic data), given that it is of worldwide scale, with global coverage of each road and point of interest, while the real-time approaches require a continuous or periodic monitoring of specific roads only (due to practical limitations and cost), while most of the time they require a difficult and complex installation of expensive infrastructure.

The method and the systems are characterized by an inherent motivation mechanism for the PNA users, so that these participate and contribute actively in the whole operation of the system, thereby ensuring the effectiveness of the global (or regional, as desired) map that is derived from the map upgrade procedure based on the use data of the users.

The method and the systems are compatible with all the available PNA, and all the available navigation systems can be easily modified to execute the method in order to upgrade their maps.

Analysis of Our Methodology and Systems

A1. Data Collection Methodology (DCM)

The Data Collection Methodology (DCM) [FIG. 1] is a methodology for collecting information related to the traffic in various road segments from drivers moving through the road network, by using their PNA, and consists of the following steps:

Step 1: A PNA user (i.e., the driver of a vehicle or a pedestrian, equipped with a PNA) moves through the road network, while the data collection system (DCS) of his/her PNA is activated.

Step 2: As the user (driver) passes through various roads, the PNA records various information for each segment of the road network (e.g. parts between successive junctions), such as the mean travel time for that specific segment, the timestamp of the travel (day and time), as well as other data that the user may have input or may have received in another way (e.g. weather conditions, type of the vehicle, etc.), or even later deduced (e.g. holiday type, via a calendar lookup).

Step 3: The above information is recorded in a storage medium, in encrypted and compressed form, so that the confidentiality of the user's personal data is ensured.

Step 4: Along with the above data, supplementary information is recorded, such as a digital signature and a digital digest (e.g., MD5) of the data, so that the integrity and authenticity of the recorded information is ensured and proven to the central system (CS). Specifically, the digital signature will prove to the central system that the submitted data have actually been produced by a genuine and approved data collection software of a given PNA and at a specific point in time. This mechanism also ensures that the same data can be submitted only once to the central server. It should be noted that in each phase the identities of the PNA and of the user are protected, given that the employed encryption methods (hash functions, digital signatures/digests, etc.) are not reversible and the personal data is used only for the creation of personal keys, which are not stored or disclosed unprotected.

Step 5: If the storage device is almost full, (the related threshold is defined as a parameter of the system), then the user is notified to send his data to the central system.

Step 6: If the space in the storage device is exhausted, then the new data is stored by deleting the oldest stored data in a circular manner (circular tail). In this way, data overflowing is prevented even when the user constantly neglects to send his stored data.

A2. Data Collection System (DCS)

The data collection system (DCS) consists of a specific software module in combination with a PNA, which executes the said data collection methodology (DCM).

The DCS may interact with the basic software of the PNA, while it interacts with the GPS receiver for the reception of the position coordinates, as well as with the storage medium of the PNA.

The DCS may potentially interact with other information sources too, such as online services (e.g. road sensor systems etc.) which are available through cellular or other wireless communication networks and respective providers, thereby supplementing the collected (primary) elements with additional related information.

Furthermore, the DCS allows the following operations:

The users may interact with the DCS by inputting additional information, such as weather conditions when traveling, the size and other characteristics of the road (e.g. the number of lanes, urban or non-urban network, the speed limit, various points of interest, etc.).

The users may activate or deactivate the DCS at will, in order to allow the recording of the data only when desired, thereby protecting their privacy.

B1. Data Incorporation Methodology (DIM)

The Data Incorporation Methodology (DIM) [FIG. 2] refers to a procedure executed at the central data input system, external to the PNA, and performs the incorporation of the user traces into the central maps and databases. It consists of the following steps:

Step 1: The user is initially connected to the central server (after a typical identity control procedure, not necessarily related to its real identity, in order to protect his personal data). Then, by the use of the software of the data incorporation system (DIS), it uploads to the server the data that has been stored in the storage medium of the PNA. The data is in the form of a data file, of a given format, compressed and encrypted, and it is sent to the central server either through an online connection with the PNA, or by another computer with an internet connection. The initiation of the file transfer procedure is performed at will. If this procedure is stopped or fails, then it is repeated. If it is successful, then the data is deleted from the storage device.

Step 2: The uploaded user data is verified with respect to its integrity and authenticity. If the verification is successful, then a related receipt is issued and provided to the user, while the user's account is credited accordingly. The function, which computes the credit amount (user's debit-credit function, UDCF), is analyzed below.

Step 3: The sent data set is stored temporarily at the central system (CS), at a separate place, designated as "Temporary Memory of Data to be Confirmed" (TMDC), to be confirmed after comparison with other similar user trace data, corresponding to the same road segments.

Step 4: The new data set is compared with other respective data that is stored in the TMDC, or with data from the central map database, based on a set of road segments and their respective parameters. If a sufficient number of data sets report similar values for the same cases, then all these data sets are considered as "confirmed". All the confirmed data sets are allowed to be incorporated in the central map database. Otherwise, the differentiated data sets are characterized as "invalid" and are stored for future processing in a different memory area, (e.g. to confirm, whether a user tends to systematically send false or misleading data to the central system).

Step 5: A "confirmed" data set is initially connected (in the statistical sense) with available data from the central database, e.g. by using average functions, excluding deviating values, normalization, etc.

The User's Debit-Credit Function (UDCF)

The "User's Debit-Credit Function" (UDCF) defines:

a) an amount credited to a user, based on the quantity and type of trace data that the user uploads to the central server, and b) an amount debited to a user, depending on the particular characteristics of the selected (to be downloaded) map area.

It is a linear combination of various parameters and factors, e.g. new covered road segments (in km), new points of interest, etc. Both the new covered and the already covered (even for several times) data sets are credited to the users using different weights. The result of the UDCF is measured arbitrarily in "credit units" (CU).

B2. Data Incorporation System (DIS)

The Data Incorporation system (DIS) consists of the following two sub-systems:

1. A software module, in combination with the hardware of a PNA, which enables the users to load user-collected trace data sets to the Central System, by executing step 1 of DIM.

2. A software module of the central system (i.e., a server module) in combination with the hardware of a web-connected central server, which executes the operation of DIM (steps 2-5). This system consists of the necessary hardware, software and system software, which is required for the execution of a typical web-server and ftp-server. The central subsystem of the DIS maintains a global map in combination with a special purpose database or some other form of data structures and storage. It can also receive uploaded user traces, globally, through its web presence (as a web-server and ftp-server) and its continuously active connection to the Internet. The DIS are implemented as a multi-tier architecture, distributed multiprocessing cluster, with crypto-accelerators and load-balancers for improved performance, continuous availability and fault tolerance.

C1. Data Distribution Methodology (DDM)

The Data Distribution Methodology (DDM) [FIG. 3] refers to a procedure performed by the Central System and implements the distribution of updated map data to the PNA users, based on a specific debit-credit information exchange system. It consists of the following steps:

Step 1: The user issues a request for (updated) map data, along with: a) the amount of his available credit that his wishes to deposit, b) a description of the general area of map that he wishes to obtain (e.g. the center and radius of a circular area, or the corners of a rectangle, etc.).

Step 2: Based on the information of step 1 of the DDM (above), the Central System decides how much map area and which road segments will be provided to the user. The criterion for the decision is based on a cost function, a part of the UDCF, which calculates a "cost" for the information contained in the map, as a linear combination of primary information units, linearly weighted with properly selected weights and subsequently solves a linear programming/optimization problem with constraints.

Step 3: The Central System stores (encrypted and compressed) the requested map data in a file, which is provided to the user, while at the same time the relevant debit is made on the user's personal account in the Central System.

Step 4: The user downloads the data file (generated from step 3, above) and stores it in the storage unit of his/her PNA.

Step 5: The client module of the data distribution system (DDS, see above) decompresses and confirms/verifies the reception of the data file (from step 4, above).

Step 6: The client module of the data distribution system (DDS) reads the obtained data file (from step 4, above), re-encodes it in a specific format, in order to be compatible with each individual PNA and incorporates it along with the existing—inside the PNA—map data, which are typically used by the software of the PNA for routing (see RS, below).

For example, the data re-encoding can be implemented by sparse, multi-dimensional arrays, or interconnected lists with records (associated with each road segment) of the form:

[{<case type>:<case value>,}::<traveling time>]
(e.g. [day_period:(13:00-16:00), season:summer, conditions:rain,
vehicle_type:fast_4-wheel::2.53 sec],
with proper binary encoding, which combines access speed, low storage capacity and extendibility).

C2. Data Distribution System (DDS)

The data distribution system (DDS) consists of the following two subsystems:

1. A client module in combination with the hardware of a PNA, which enables the users to download map data files from the Central Server and to incorporate them in the map system of various PNAs, thereby executing steps 1, 5 and 6 of DDM.

2. A server module in combination with the hardware of a web-interconnected Central Server System (CSS), which executes the operation of DDM (steps 2-4) for the selection of map data, which a PNA user wishes to obtain, based on a specific (not of financial but of technical nature) debit-credit system.

D1. Routing Method (RM)

Taking into account the new dynamic traffic data and other recorded parameters, which are included in the supplementary navigation maps (i.e. in the extended map database) of the PNA, the basic routing algorithm of the navigation software is modified so that it computes and optimizes the total routing cost based on the costs of individual road segments that were collected, incorporated and computed according to the DCM and DIM. This new algorithm is similar to those used today in various commercially available PNA, except that, in our algorithm the weights of the road segments are multiple, parametric, not static, but time-dependent, and are derived either from auxiliary navigation maps, or from available extended navigation maps. The costs may refer to traveling time, or fuel cost in order to travel a road segment or a combination thereof, (e.g. with a complex criterion of the form: "find the shortest route with cost not larger than 120% of the cost of the minimum travel cost", etc.).

D2. Routing System (RS)

The routing system (RS) consists of a software module in combination with hardware of a PNA, which implements the routing decision, according to the RM method described above. The RS may be installed in the PNA, either as an independent module, only providing the said alternative routing information, or as embedded functionality of the navigation software of the PNA.

GLOSSARY

CS Central System
CSS Central Server System
DCM Data Collection Methodology
DCS Data Collection System
DDM Data Distribution Methodology
DDS Data Distribution System
DIM Data Incorporation Methodology
DIS Data Incorporation System
GPS Global Positioning System
PNA (GPS-based) Personal Navigation Assistant
RM Routing Methodology
RS Routing System
TMDC Temporary Memory of Data to be Confirmed
UDCF User's Debit-Credit Function

The invention claimed is:

1. Methodology for the collection, processing and distribution of traffic data and delivering more accurate routing in GPS-based Personal Navigation Assistants (PNAs), the methodology consisting of:
  a) a Data Collection Methodology (DCM), which is characterized by a procedure for recording and processing by a PNA (with "digital signature" and "digital digest", as defined in standard cryptology) of dynamic traffic data and vehicle parameters, which ensures the validity, authenticity, verifiability and uniqueness of the collected data; this data consisting of a "timestamp" (i.e., date and time of recording), speed and duration of traveling through each road segment, state of the road, weather conditions, type of vehicle, working day or type of holiday; both for the already mapped, and for unmapped (uncharted) road network,
  b) a Data Incorporation Methodology (DIM), which is characterized by:

i) the checking by the Central System (CS) of the integrity, authenticity, uniqueness and validity of the data submitted by a PNA to the CS, and ii) by the statistical incorporation and encoding of this data into a single "global map" (i.e. a map of the world) database, after offline processing of the data performed by the CS, c) a Data Distribution Methodology (DDM), which is characterized by the selection of a "dynamic map" part from the single "global map" database of the CS, the ensuring of the integrity, authenticity and uniqueness of the data, and the re-encoded incorporation of the data in the available map system of a PNA, d) a Routing Methodology (RM), which is characterized by the use of the encoded "dynamic maps" (defined as conventional map data structures augmented with an extra layer of time-variant, traffic-related information, such as travel times per road segment for combinations of time-of-day, season-of-year, holiday-type, weather-conditions and vehicle-type), produced by the DIM, in combination with the conventional (static) maps of a PNA, in order to obtain—using the PNA—an improved routing decision from a starting point to a final destination, with or without intermediate destinations, based on:

i) dynamic (space/time-dependent) traffic data, i.e. the combination of time-of-the-day, day-of-the-week, season-of-the-year, type-of-vehicle, type-of-weather, road-conditions, and type-of-holiday, and ii) decision criteria, such as, shortest travelling time, less fuel cost, or a combination thereof, as specified by the user/driver, and said methodology being implemented with a Central System (CS) and one or more offline portable PNAs;

whereas, the said three sub-methodologies (a)-(c) are interdependent and compose in an integrated manner the overall methodology, which undividedly solves the technical problem of improving the routing decision accuracy of a PNA;

whereas, the DCM regards the collection of information related to the traffic flow in each road segment (based on the traveling speed per type of vehicle and the state of the road in a given time period), by drivers that travel in the road network making use of their PNA;

whereas, the DCM is characterized by the recording, for each travelled road segment, of a combination of information, consisting of the traveling timestamp (time and date), the traveling duration and length of the segment, the weather conditions (or state of the road) (sun, fog, rain, snow), the type of the vehicle (low/medium/high speed, 2/4-wheel, truck, bus, motorcycle, pedestrian); (where, a travelled road segment is identified by mapping a sequence of recorded GPS coordinates), whereas, the DCM is characterized by the data recorded also for non-registered road segments (i.e. those that are not included in the database of the map of a PNA), leading to the potential creation of new maps);

whereas, the traffic data is recorded on a storage medium, at the PNA, in encrypted and compressed form, so that the privacy of the user's personal data is ensured;

whereas, along with the traffic data, additional information is also recorded in the PNA's storage medium, such as a "digital signature" and a "digital digest" (e.g. MD5) of the data (i.e., well known cryptographic processes, also referred to as a "mathematical summary" of a given data set, which is generated by means of applying an irreversible hash function to the given input data, combined with asymmetric encryption), so that the integrity and authenticity of the recorded information is ensured and proved to the central system, thus preventing or rejecting multiple submissions by the users;

whereas, the DIM refers to a procedure which is executed at the central system (CS), outside the PNA, performing the incorporation of the "trace data" (i.e. user-submitted route-related information, consisting of a list of periodically collected, time-stamped GPS samples, augmented with other parameter values defining the vehicle-type, weather-conditions, road-type, holiday-type), collected by the DCM, into the central maps and the central databases;

whereas, the DIM is characterized by the verification—with respect to the integrity, authenticity and uniqueness—of the trace data collected by the DCM;

whereas, the DIM is also characterized by the temporary storage, at the central system, of the obtained data, until it is verified by means of comparing it with other similar trace data submitted by other users and corresponding to the same road segments, before this data is considered valid for distribution and become available to all other PNA users;

whereas, the verification of the uploaded trace data is executed by statistical processing of a sufficient statistical sample (with averaging functions, exclusion of extreme values, normalization, and extrapolation), resulting in the creation of an encoded "global map" database;

whereas, the RM is characterized by the determining, by means of suitable PNA software, of the shortest route from a starting point to a final destination, with or without intermediate destinations, through the combining the static data from existing maps residing inside the PNA, with the dynamic (time-variant) data derived by the DIM;

whereas, the RM is also characterized by the estimation of the fuel cost of a specific route and the subsequent determination, by PNA software, of the most cost-effective route from a given starting point to a final destination, with or without intermediate destinations, through the combining the static data from existing maps residing inside the PNA, with the dynamic (time-variant) data derived by the DIM;

whereas, the RM is also characterized by the capability to combine the aforementioned routing optimizations (i.e. shortest route and less costly route), based on criteria, selected interactively by the PNA user, for mapped or unmapped road network.

2. A methodology for the collection, processing and distribution of traffic data and delivering more accurate routing in GPS-based Personal Navigation Assistants (PNAs), the methodology comprising:

a) a Data Collection Methodology (DCM), which is characterized by a procedure for recording and processing by a PNA (with "digital signature" and "digital digest", as defined in standard cryptology) of dynamic traffic data and vehicle parameters, which ensures the validity, authenticity, verifiability and uniqueness of the collected data; this data including a "timestamp" (i.e., date and time of recording), speed and duration of traveling through each road segment, state of the road, weather conditions, type of vehicle, working day or type of holiday; both for the already mapped, and for unmapped (uncharted) road network, b) a Data Incorporation Methodology (DIM), which is characterized by:

i) the checking by the Central System (CS) of the integrity, authenticity, uniqueness and validity of the data submitted by a PNA to the CS, and ii) by the statistical incorporation and encoding of this data into a single "global map" (i.e. a map of the world) database, after offline processing of the data performed by the CS, c) a Routing Methodology (RM), which is characterized by the use of the encoded "dynamic maps" (defined as conventional map data structures augmented with an extra layer of time-variant, traffic-related information, such as travel times per road segment for combinations of time-of-day, season-of-year, holiday-type, weather-conditions and vehicle-type), produced by the DIM, in combination with the conventional (static) maps of a PNA, in order to obtain—using the PNA—an improved routing decision from a starting point to a final destination, with or without intermediate destinations, based on:

i) dynamic (space/time-dependent) traffic data, i.e. the combination of time-of-the-day, day-of-the-week, season-of-the-year, type-of-vehicle, type-of-weather, road-conditions, and type-of-holiday, and ii) decision criteria, such as, shortest travelling time, less fuel cost, or a combination thereof, as specified by the user/driver, and the methodology being implemented with a Central System (CS) and one or more offline portable PNAs;

whereas, the three sub-methodologies (a)-(c) are interdependent and compose in an integrated manner the overall methodology, which undividedly solves the technical problem of improving the routing decision accuracy of a PNA;

whereas, the DCM regards the collection of information related to the traffic flow in each road segment (based on the traveling speed per type of vehicle and the state of the road in a given time period), by drivers that travel in the road network making use of their PNA;

whereas, the DCM is characterized by the recording, for each travelled road segment, of a combination of information, including the traveling timestamp (time and date), the traveling duration and length of the segment, the weather conditions (or state of the road) (sun, fog, rain, snow), the type of the vehicle (low/medium/high speed, 2/4-wheel, truck, bus, motorcycle, pedestrian); (where, a travelled road segment is identified by mapping a sequence of recorded GPS coordinates), whereas, the DCM is characterized by the data recorded also for non-registered road segments (i.e. those that are not included in the database of the map of a PNA), leading to the potential creation of new maps);

whereas, the traffic data is recorded on a storage medium, at the PNA, in encrypted and compressed form, so that the privacy of the user's personal data is ensured;

whereas, along with the traffic data, additional information is also recorded in the PNA's storage medium, such as a "digital signature" and a "digital digest" (e.g. MD5) of the data (i.e., well known cryptographic processes, also referred to as a "mathematical summary" of a given data set, which is generated by means of applying an irreversible hash function to the given input data, combined with asymmetric encryption), so that the integrity and authenticity of the recorded information is ensured and proved to the central system, thus preventing or rejecting multiple submissions by the users;

whereas, the DIM refers to a procedure which is executed at the central system (CS), outside the PNA, performing the incorporation of the "trace data" (i.e. user-submitted route-related information, including a list of periodically collected, time-stamped GPS samples, augmented with other parameter values defining the vehicle-type, weather-conditions, road-type, holiday-type), collected by the DCM, into the central maps and the central databases;

whereas, the DIM is characterized by the verification—with respect to the integrity, authenticity and uniqueness—of the trace data collected by the DCM;

whereas, the DIM is also characterized by the temporary storage, at the central system, of the obtained data, until it is verified by means of comparing it with other similar trace data submitted by other users and corresponding to the same road segments, before this data is considered valid for distribution and become available to all other PNA users;

whereas, the verification of the uploaded trace data is executed by statistical processing of a sufficient statistical sample (with averaging functions, exclusion of extreme values, normalization, and extrapolation), resulting in the creation of an encoded "global map" database;

whereas, the RM is characterized by the determining, by means of suitable PNA software, of the shortest route from a starting point to a final destination, with or without intermediate destinations, through the combining the static data from existing maps residing inside the PNA, with the dynamic (time-variant) data derived by the DIM;

whereas, the RM is also characterized by the estimation of the fuel cost of a specific route and the subsequent determination, by PNA software, of the most cost-effective route from a given starting point to a final destination, with or without intermediate destinations, through the combining the static data from existing maps residing inside the PNA, with the dynamic (time-variant) data derived by the DIM;

whereas, the RM is also characterized by the capability to combine the aforementioned routing optimizations (i.e. shortest route and less costly route), based on criteria, selected interactively by the PNA user, for mapped or unmapped road network.

3. A methodology for the collection, processing and distribution of traffic data and delivering more accurate routing in GPS-based Personal Navigation Assistants (PNAs), the methodology comprising:

a) a Data Collection Methodology (DCM), which is characterized by a procedure for recording and processing by a PNA of dynamic traffic data and vehicle parameters; this data including a "timestamp" (i.e., date and time of recording), speed and duration of traveling through each road segment, state of the road, weather conditions, type of vehicle, working day or type of holiday; both for the already mapped, and for unmapped (uncharted) road network, b) a Data Incorporation Methodology (DIM), which is characterized by:

i) the checking by the Central System (CS) of the integrity, authenticity, uniqueness and validity of the data submitted by a PNA to the CS, and ii) by the statistical incorporation and encoding of this data into a single "global map" (i.e. a map of the world) database, after offline processing of the data performed by the CS, c) a Routing Methodology (RM), which is characterized by the use of the encoded "dynamic maps" (defined as conventional map data structures augmented with an extra layer of time-variant, traffic-related information, such as travel times per road segment for combinations of time-of-day, season-of-year, holiday-type, weather-conditions and vehicle-type), produced by the DIM, in combination with the conventional (static) maps of a PNA, in order to obtain—using the PNA—an improved routing decision from a starting point to a final destination, with or without intermediate destinations, based on:

i) dynamic (space/time-dependent) traffic data, i.e. the combination of time-of-the-day, day-of-the-week, season-of-the-year, type-of-vehicle, type-of-weather, road-conditions, and type-of-holiday, and ii) decision criteria, such as, shortest travelling time, less fuel cost, or a combination thereof, as specified by the user/driver;

whereas, the three sub-methodologies (a)-(c) are interdependent and compose in an integrated manner the overall methodology, which undividedly solves the technical problem of improving the routing decision accuracy of a PNA;

whereas, the DCM regards the collection of information related to the traffic flow in each road segment (based on the traveling speed per type of vehicle and the state of the road in a given time period), by drivers that travel in the road network making use of their PNA;

whereas, the DCM is characterized by the recording, for each travelled road segment, of a combination of information, including the traveling timestamp (time and date), the traveling duration and length of the segment, the weather conditions (or state of the road) (sun, fog, rain, snow), the type of the vehicle (low/medium/high speed, 2/4-wheel, truck, bus, motorcycle, pedestrian); (where, a travelled road segment is identified by mapping a sequence of recorded GPS coordinates), whereas, the DCM is characterized by the data recorded also for non-registered road segments (i.e. those that are not included in the database of the map of a PNA), leading to the potential creation of new maps);

whereas, the DIM refers to a procedure which is executed at a central system (CS), outside the PNA, performing the incorporation of the "trace data" (i.e. user-submitted route-related information, including a list of periodically collected, time-stamped GPS samples, augmented with other parameter values defining the vehicle-type, weather-conditions, road-type, holiday-type), collected by the DCM, into the central maps and the central databases;

whereas, the DIM is also characterized by the temporary storage, at the central system, of the obtained data, until it is verified by means of comparing it with other similar trace data submitted by other users and corresponding to the same road segments, before this data is considered valid for distribution and become available to all other PNA users;

whereas, the verification of the uploaded trace data is executed by statistical processing of a sufficient statistical sample (with averaging functions, exclusion of extreme values, normalization, and extrapolation), resulting in the creation of an encoded "global map" database;

whereas, the RM is characterized by the determining, by means of suitable PNA software, of the shortest route from a starting point to a final destination, with or without intermediate destinations, through the combining the static data from existing maps residing inside the PNA, with the dynamic (time-variant) data derived by the DIM;

whereas, the RM is also characterized by the estimation of the fuel cost of a specific route and the subsequent determination, by PNA software, of the most cost-effective route from a given starting point to a final destination, with or without intermediate destinations, through the combining the static data from existing maps residing inside the PNA, with the dynamic (time-variant) data derived by the DIM;

whereas, the RM is also characterized by the capability to combine the aforementioned routing optimizations (i.e. shortest route and less costly route), based on criteria, selected interactively by the PNA user, for mapped or unmapped road network.

* * * * *